H. C. SIMONS.
LATHE.
APPLICATION FILED APR. 25, 1913.
1,136,178.
Patented Apr. 20, 1915.
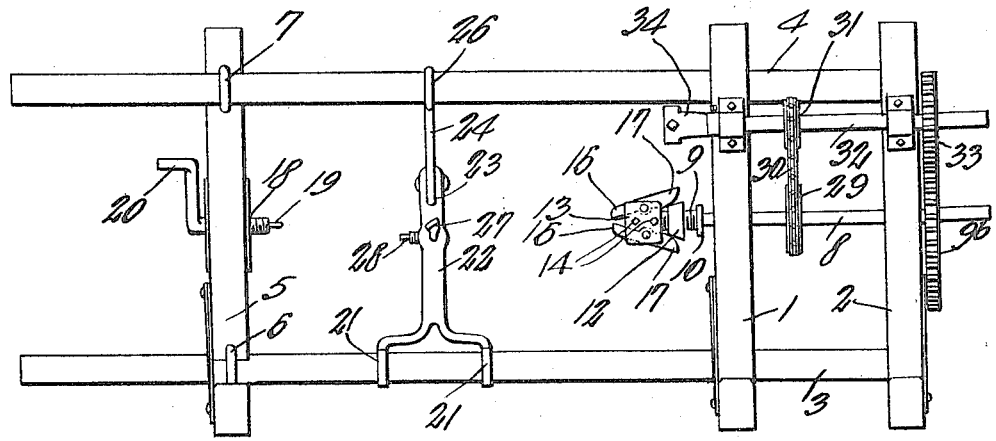
Fig. 1.
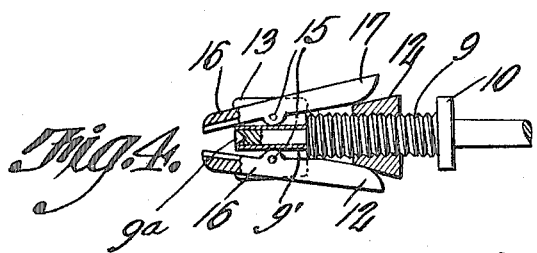
Fig. 4.
Fig. 2.
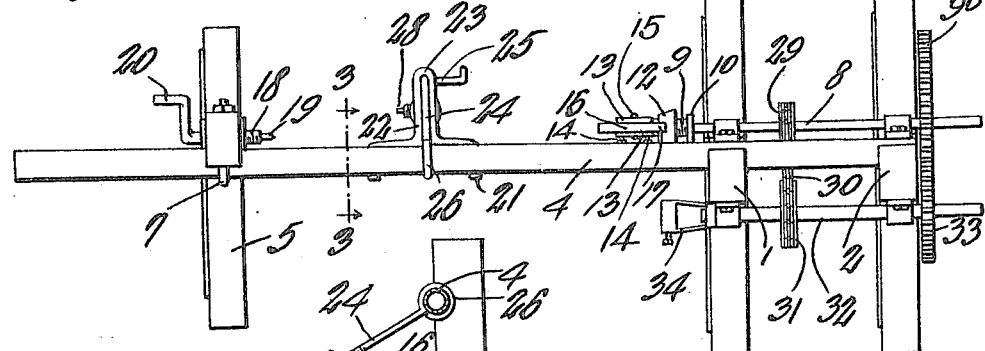
Fig. 3.
Witnesses
Henry C. Simons
Inventor
by 
Attorneys

UNITED STATES PATENT OFFICE.

HENRY C. SIMONS, OF ODEBOLT, IOWA.

LATHE.

1,136,178.  Specification of Letters Patent.  Patented Apr. 20, 1915.

Application filed April 25, 1913. Serial No. 763,673.

*To all whom it may concern:*

Be it known that I, HENRY C. SIMONS, a citizen of the United States, residing at Odebolt, in the county of Sac and State of Iowa, have invented a new and useful Lathe, of which the following is a specification.

The present invention relates to improvements in lathes, one object of the invention being the provision of a lathe in which the chuck carrying standards are provided with means whereby the centering carrying standard may be moved adjustably to and from the chuck standard to accommodate the lathe to various sized work, the connecting medium being provided with a tool supporting frame, which is readily adjustable to and from the work supported between the chuck and center.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a view in elevation of the complete lathe. Fig. 2 is a top plan view thereof. Fig. 3 is a section taken on line 3—3 of Fig. 2. Fig. 4 is an enlarged detail view of the work engaging chuck.

Referring to the drawings, the numerals 1 and 2 designate the two parallel standards or supports which are secured fixedly with relation to each other and have attached thereto the two horizontal and parallel, and cylindrical, preferably tubular, bars or rods 3 and 4, which are adjustably connected to the slidably mounted center carrying standard or support 5, by means of the clamps 6 and 7, as clearly illustrated in Figs. 1 and 2. It will thus be seen that by releasing the clamps 6 and 7 that the standard or support 5 may be moved to the right or left as viewed in Fig. 1 and that the clamps 6 and 7 can then be operated to secure the same fixedly upon the parallel members 3 and 4.

A short horizontal shaft 8 is journaled upon the standards 1 and 2 intermediate of the bars 3 and 4, and carries upon one end exterior of the standard 2, the main driving gear 9$^b$, any means being connected to the shaft 8, whereby the same is rotated. The other end, beyond the inner face of the standard 1, is threaded as at 9, having the limiting collar 10, while disposed for adjustment upon the threaded portion 9 is a cone 12. The two plates 13 are connected by set screws 14 to the sleeve 9′ which is itself secured to the shaft by means of the aforesaid set screws 14. The pins 15 pivotally attach the work engaging members 16, to and between the plates 13, the rear terminals 17 of said members 16 being disposed to be engaged by the movable cone 12. which when rotated moves the members 16 into and out of work engaging position. A center recess 9$^a$ is provided. Thus a novel form of, and easily connected and disconnected, chuck for engaging one end of the work is provided.

The screw 18 is connected to the standard or post 5 and constitutes the center carrying member, the same being provided with the stationary center 19 and the crank 20, whereby the screw 18 will move the center 19 into and out of work engaging position, said center 19 being disposed to be in axial alinement with the shaft 8.

By means of the adjustability of the standard 5 which carries the center 19, said standard may be moved to and from the standard 1 upon the bars 3 and 4 and be clamped in any desired position so that various lengths of material may be supported between the chuck carried by the shaft 8 and the stationary center 19.

In order to provide a means whereby the work may be operated upon at any point between the chuck carried by the member 8 and the center 19, the yoke having the apertured terminals 21 embracing the lower bar 3 is provided, the main bar 22 of said yoke being extended upwardly and slotted at 23 for the adjustable reception of the lower threaded end of the adjusting rod 24, the hand operated nut 25 being disposed upon the threaded end of the rod 24, as clearly illustrated in Fig. 3, so that the bar 22 may be inclined to and from the axial line between the shaft 8 and center 19, or to and from work engaging position. The terminal 26 of the rod 24 is disposed to embrace the bar or rod 4, so that the two members may be slid longitudinally of the lathe so that the tool 27 connected adjustably by means of the set screw 28 to the bar 22 may be positioned for operating upon the work in the lathe at any point desired.

Where it is undesirable to use the center 19, and it is only necessary to support the work in a chuck, the shaft 32 having the gear 33 at one end and meshing with the gear 9$^b$ is provided, the chuck 34 being positioned upon the other end beyond the face of the post 1 so that the work may be clamped therein while the shaft 32 is being rotated. The gears 9$^b$ and 33 are disposed to be interchanged, so that the shaft 32 may be rotated at a slow or rapid speed.

In order to provide a means for rotating the shaft 32 in an opposite direction to the gearing 9$^b$ and 33, the gear 9$^b$ and 33 being removed at this time, a sprocket 29 is keyed upon the shaft 8, and has trained thereover a sprocket chain 30, which engages the sprocket 31 of the shaft 32, thus providing a means whereby when the shaft 8 rotates the shaft 32, through the chain connection, said shaft 32 will be rotated in a reverse direction from that rotated through the gears 9$^b$ and 33. When the gears 9$^b$ and 33 are operated, the chain 30 is disconnected, and when the shaft 8 carrying its chuck and the center 19 are brought into play, the gear connection and chain connection with the shaft 32 is also disconnected.

It is apparent that any clutch mechanism may be provided to connect and disconnect the shaft 8 to the shaft 32, and still be within the scope of the present invention and thus provide a ready means whereby the shaft 32 may be disconnected to the shaft 8 to be rendered inoperative or may be connected to be rotated in the same or reverse direction. The shafts 8 and 32 are extended beyond the standard 2, for the reception of cranks or other power transmitting means by which the shafts may be rotated.

What is claimed is:

1. The combination with the frame of a lathe having two horizontally disposed parallel tool supporting members, of a tool carrier, including a member having a yoke upon one end for slidably engaging one supporting member of the lathe, and an adjustable supporting screw having one end slidably engaging the other supporting member of the lathe and having its free end slidable through the opposite end of the said member for adjusting the tool carrier member relatively to the adjusting member and to maintain the parts in adjusted position.

2. The combination with the frame of a lathe having two horizontally disposed parallel tool supporting members, of a tool carrier, including a tool carrying member having spaced apertured terminals, an adjustable support for the opposite end freely passing through the opposite end of the tool carrying member, and a hand-nut thereon for regulating the angular relation of the members to each other.

In testimony that I claim the foregoing as my own, I have hereto affixed my signature in the presence of two witnesses.

HENRY C. SIMONS.

Witnesses:
W. E. KAHLER,
W. O. BEEL.

Copies of this patent may be obtained for five cents each, by addressing the "Commissioner of Patents, Washington, D. C."